United States Patent
Marlow

(10) Patent No.: US 8,706,661 B2
(45) Date of Patent: Apr. 22, 2014

(54) SYSTEM AND METHOD FOR GENERATING AN IMAGE SPRITE

(75) Inventor: Keith A. Marlow, Galston (AU)

(73) Assignee: Yahoo! Inc., Sunnyvale, CA (US)

( * ) Notice: Subject to any disclaimer, the term of this patent is extended or adjusted under 35 U.S.C. 154(b) by 648 days.

(21) Appl. No.: 12/616,021

(22) Filed: Nov. 10, 2009

(65) Prior Publication Data

US 2011/0113000 A1 May 12, 2011

(51) Int. Cl.
*G06F 15/18* (2006.01)
*G09G 5/00* (2006.01)
*G09G 5/10* (2006.01)
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)

(52) U.S. Cl.
USPC .............. 706/14; 345/683; 345/950; 715/235

(58) Field of Classification Search
None
See application file for complete search history.

(56) References Cited

U.S. PATENT DOCUMENTS

| | | | |
|---|---|---|---|
| 2007/0094588 A1* | 4/2007 | Klassen et al. | 715/501.1 |
| 2008/0152260 A1* | 6/2008 | Cheng et al. | 382/284 |
| 2009/0217145 A1* | 8/2009 | Watson | 715/202 |
| 2009/0248831 A1* | 10/2009 | Scott et al. | 709/217 |
| 2010/0073381 A1* | 3/2010 | Adams | 345/473 |
| 2011/0029899 A1* | 2/2011 | Fainberg et al. | 715/760 |

OTHER PUBLICATIONS

Definition of the word 'rule' as obtained from Webopedia Sep. 27, 2012. http://www.webopedia.com/TERM/R/rule.html.*

* cited by examiner

*Primary Examiner* — Kakali Chaki
*Assistant Examiner* — Daniel Pellett
(74) *Attorney, Agent, or Firm* — Berkeley Law & Technology Group, LLP

(57) ABSTRACT

A method of determining whether a sprite will be generated determines a probability of a first page module being displayed on a web page together with a second page module, and if the probability exceeds a predetermined threshold, generates the sprite based on a first image within the first page module and a second image within the second page module, a rule indicating that the sprite contains the first image and the second image, and a style sheet code associated with the sprite.

20 Claims, 4 Drawing Sheets

SYSTEM AND METHOD FOR GENERATING AN IMAGE SPRITE

BACKGROUND

1. Field of the Invention

Aspects of the present invention relate generally to a method for determining, in an automated fashion, which images within a web page should be made part of a sprite.

2. Description of Related Art

As is known in the art, web pages may include text, images and various other media. Generally, images are retrieved from a web server individually; i.e., each image requires a separate request/receive transaction with the web server. These multiple transactions can impede the speed with which the page loads, which ultimately may affect adversely the experience of the user.

One known method used to reduce the number of transactions with the web server with regard to images is to pool multiple images into a single image, called a sprite. In this case, only one request/receive transaction is required to retrieve the sprite, which can be "sliced" at the presentation layer such that only part of the sprite is displayed in any one location on the web page (e.g., one image within the sprite may be shown at the top of the web page, and another image within the sprite may be shown at the bottom, etc.).

A problem with the sprite method is that the determination as to which images will be sprited, and with what other images, generally is worked out manually, which can be labor intensive; also, the generated sprites usually are typically not readily amenable to necessary or desired modifications (e.g., when an image to be used is changed slightly, or when an image within a sprite is no longer used at all).

Thus, it may be desirable in some instances to automate either or both the decision process regarding which images to add to which sprite, and the generation of the sprite and associated presentation-layer rules governing the presentation of the images within each sprite.

SUMMARY

Embodiments of the present invention overcome the above-mentioned and various other shortcomings of conventional technology and methodologies, by providing an image sprite optimization system and method that may relieve developers of having to manually determine which images should be added to which sprite, and having to manually generate rules associated with the images' ultimate presentation.

BRIEF DESCRIPTION OF THE DRAWING FIGURES

FIGS. 1A-B illustrate two example web pages and page modules within them.

FIG. 2 is a logical flowchart illustrating one general process by which a sprite may be created for a combination of page modules.

DETAILED DESCRIPTION

Figure 1A:
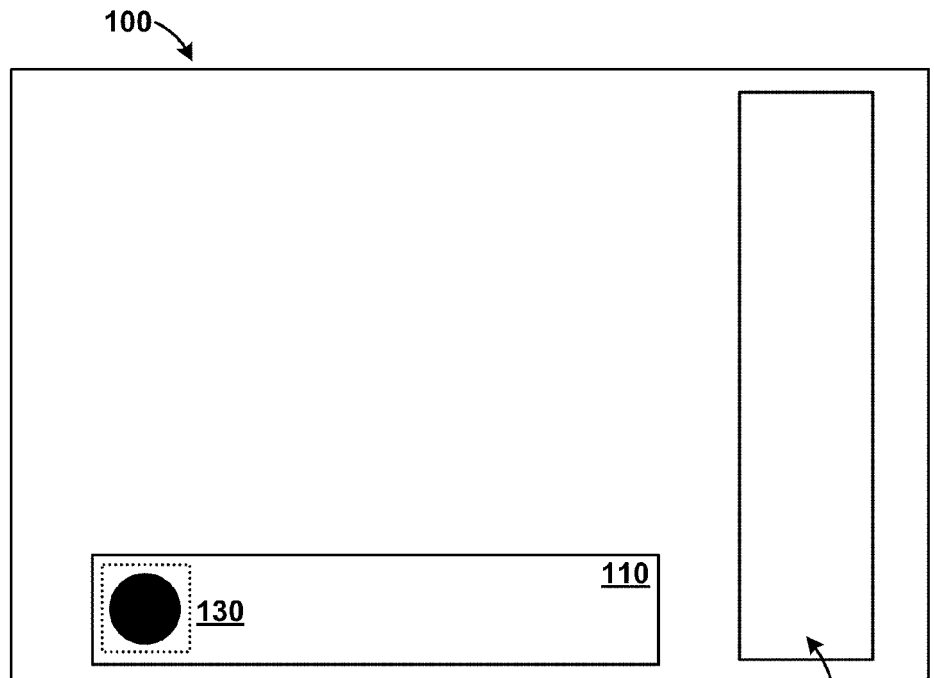

Detailed descriptions of one or more embodiments of a sprite optimization system and method follow, examples of which may be graphically illustrated in the drawings. Each example and embodiment is provided by way of explanation only, and is not meant to be construed as a limitation of the claimed subject matter. For example, features described as part of one embodiment may be utilized with another embodiment to yield still a further embodiment. It is intended that the appended claims be interpreted broadly to include these and other modifications and variations.

Aspects of the present invention are described below in the context of automating the determination of which images should be merged into a sprite, and the generation of those sprites and their associated presentation instructions.

Throughout this disclosure, reference is made to "page module," which is used to denote a certain element of a web page, which element may include text, images, video, other elements, or combination of the foregoing. Examples of page modules may include headers, footers, menus, sidebars, etc. In an embodiment, a page module may be, for example, a single image, or a text block, though other options will be readily apparent. It will be appreciated that a page module usually will have associated with it some form of markup language (e.g., HyperText Markup Language (HTML), eXtensible Markup Language (XML), eXtensible HyperText Markup Language (XHTML), etc.) for structure ("markup code"), and style sheet language (e.g., Cascading Style Sheets (CSS), etc.) for presentation and/or styling ("style sheet code"). As is known in the art, markup coupled with a style sheet language ultimately controls how and where on the web page the image is displayed. It will be appreciated that the style sheet language may be contained in a file separate from the markup language file, or may be embedded within it. Throughout the remainder of this disclosure, it is assumed that HTML is the markup language used and CSS is the style sheet language used, though it will be appreciated that the claimed subject matter is not limited to these particular languages and that they are being used by way of example only.

Figure 1B:
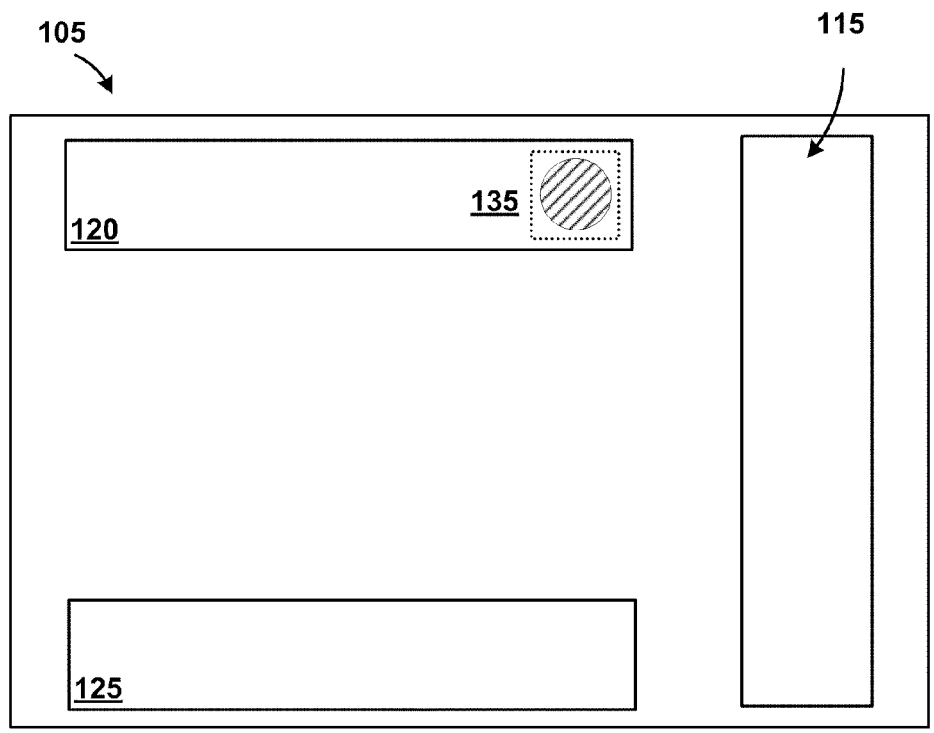

FIGS. 1A-B illustrate example page modules within two example web pages. Web page 100 contains page modules 110 and 115; i.e., web page 100 requires page modules 110 and 115. Web page 105 contains page modules 115, 120 and 125. As can be seen in FIGS. 1A-B, web pages 100 and 105 "share" page module 115 (i.e., both web pages display that particular page module), but do not share page modules 110, 120 and 125. Further, page module 110 contains image 130 and page module 120 contains image 135.

Figure 2:
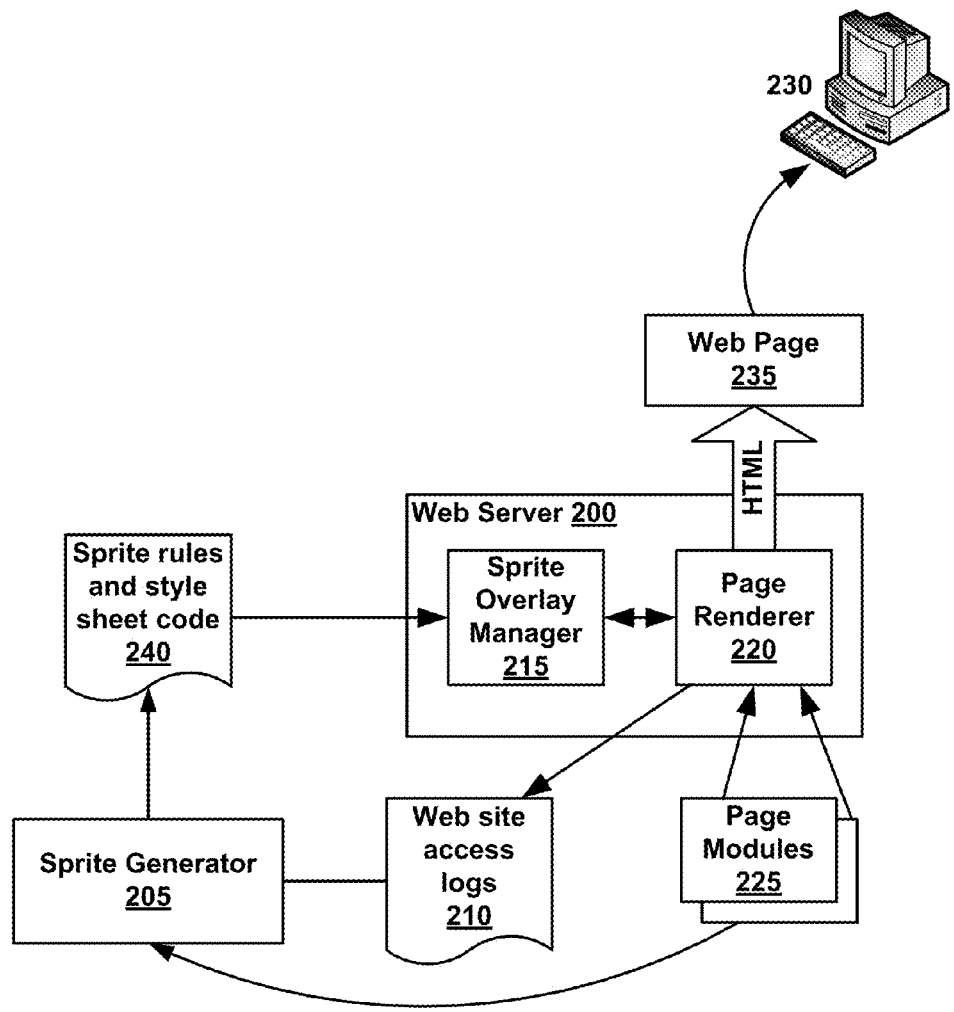
FIG. 2 is a simplified functional block diagram illustrating the general architecture of one embodiment of a sprite optimization system.

FIG. 2 is a simplified functional block diagram illustrating the general architecture of an embodiment of a sprite optimization system. Web server 200 may respond to a request from a remote device 230, e.g., associated with an end user, to receive a resource provided by web server 200, such as, for example, web page 235. It will be appreciated that web server 200 may include any of a number of servers, databases, and other components or hardware resources required for its operation, and that the combination of computers and other equipment used are not critical to the invention. Sprite generator 205 may analyze access logs 210 (as described below) and determine which page modules 225 are required by which web pages, and may further determine which page modules 225 occur together often enough such that it may be practical to combine such page modules' images into a single sprite to be shared between page modules 225 (as detailed herein). Based on these determinations, sprite generator 205 also may generate sprite rules and style sheet code 240 corresponding to generated sprites (as detailed herein).

As is shown in FIG. 2, sprite generator 205 may have access to page modules 225 so that it may determine what images belong to each page module 225, and may further determine which of those images are static (i.e., are not likely to change before page module 225 is again required by a web page) and thus may be more practically sprited. If it is determined that a particular image is dynamic, then spriting likely would result in the wrong image ultimately being served (as the image may have changed between the time it was sprited and the time it was later requested).

Web server 200 may include sprite overlay manager 215 and page renderer 220, which may recognize common page module usage patterns in web pages that match the sprite rules created by sprite generator 205, and modify the web pages' HTML and/or CSS to refer to the images' sprite-image equivalents, respectively. It is noted that in some instances, and depending on the way the HTML/CSS is structured, the markup used to display the sprited images may be the same as that used to display the non-sprited images (i.e., the HTML does not need to be modified). Further, it is not critical to the invention where the sprite rules, style sheet code and page modules are stored and/or retrieved from, only that they are accessible by web server 200 when a web page that requires them is requested. In that regard, it will be appreciated that sprite generator 205, access logs 210, page modules 225, sprite rules 240, or a combination of these and other system elements may be integrated with or resident on web server 200.

It will be appreciated that web server 200, sprite generator 205, sprite overlay manager 215 and page renderer 220 illustrated in FIG. 2 may be implemented as hardware elements (e.g., application specific integrated circuit (ASIC) components, system on chip (SoC) components, or other dedicated electronic hardware) in some instances; in some applications, such hardware elements may be selectively reprogrammable via firmware instructions or register settings. Alternatively, the modules depicted in FIG. 2 may be wholly or partially embodied in or implemented by software or other instruction sets executable by general-purpose hardware components. Further, it is noted that the several components of FIG. 2 may be distributed across more than one physical machine (e.g., computer workstation or server).

Figure 3:
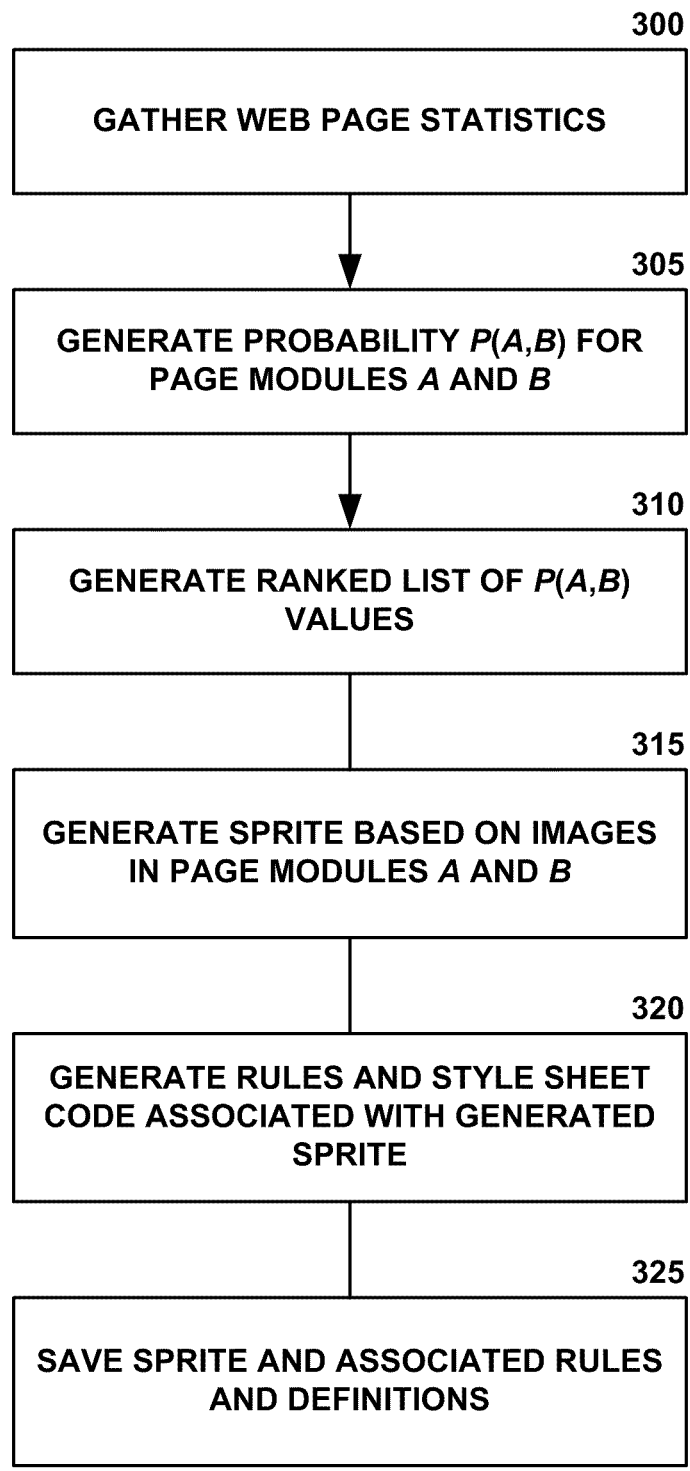
FIG. 3 is a logical flowchart illustrating one general process by which a sprite may be created for a combination of page modules.

FIG. 3 is a logical flowchart illustrating one general process by which multiple images may be combined into a single sprite and the corresponding CSS generated according to an embodiment. In some implementations, the operations depicted in FIG. 3 may be executed by various of the functional components illustrated in FIG. 2. At block 300, web page statistics, including how often a web page is requested from the web server and which page modules were required by the web page may be gathered for each web page served by the web server or a subset thereof. The statistics may be gathered over the life of the web page, or over a predetermined or dynamically variable period (e.g., the previous three months), for instance. In some circumstances, analysis of the statistics generally will not be done in real-time, but rather "offline" (i.e., the analysis most likely will occur on a rolling basis, in the background, and not just when a request is received, etc.), though real-time or near real-time statistical computations may be appropriate in other circumstances, such as when sufficient processing resources and computational bandwidth are available, network data traffic conditions are light, or a combination of these and other factors.

At block 305, the web page statistics may be used (e.g., by the sprite generator) to generate a probability P(A,B) of module A being viewed together with module B; i.e., the probability that modules A and B will be served together on the same web page at some point in the future. The calculated probability of such an occurrence may be based on the frequency with which the combination was observed, as evidenced by an analysis of the web page statistics. Probabilities for all, or a subset of all combinations observed by the web page statistics may be generated. It will be appreciated that the combinations need not be limited to just two page modules, but in fact may comprise any number of page modules as is practicable and/or useful. For the remainder of this disclosure, it will be assumed that all combinations consist of two page modules for simplicity of description only.

At block 310, the combinations for which probabilities were generated may be placed (e.g., by the sprite generator) into a decreasing ranked list based on the combinations' associated probabilities. For example, if combination X has probability 50%, combination Y has probability 60% and combination Z has probability 75%, then the decreasing ranked list may be Z, Y, X.

At block 315, sprites may be generated for particular combinations of page modules. The decision as to which combinations should have their images merged can be based on any of a number of criteria. For example, sprites could be created for just the combinations comprising the top 10% of a list of combinations ranked in decreasing order of the probability of the combinations occurring in the future (as described above). In an embodiment, the images within two or more combinations may be merged into a single sprite (i.e., the sprite may contain images from four or more page modules, assuming two page modules per combination).

Figure 4:
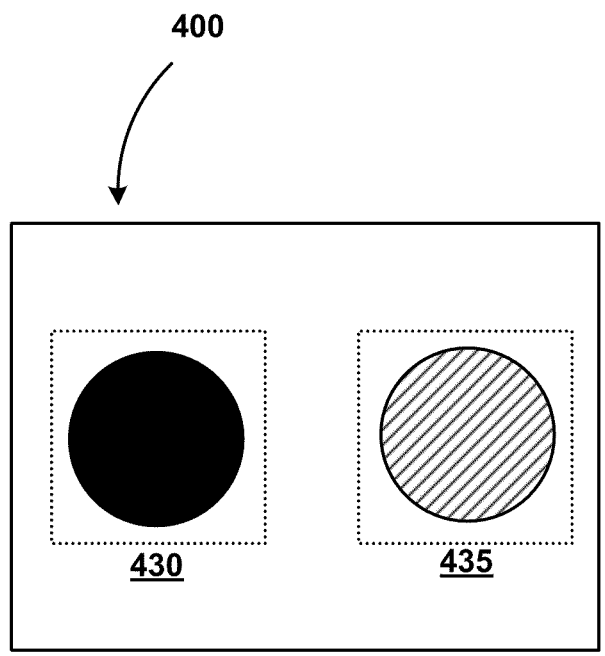
FIG. 4 is an example sprite containing two images within it.

As a concrete example of two page modules' images having been merged into a single sprite, consider images 130 and 135 from FIGS. 1A-B. Assuming page modules 110 and 120 fall within the criteria used at block 315 to determine if a sprite should be generated for a combination, then the page modules' images may be combined into a sprite, as shown in FIG. 4. Sprite 400 is a single image (e.g., sprite.png) that contains images 130 and 135 within it, as sprite "sections" 430 and 435, respectively.

At block 320, rules and style sheet code associated with the sprites may be generated. A rule may indicate that a certain combination (e.g., a pair of page modules) has had a sprite generated for it, so that when a web page that uses both of the page modules comprising the combination is built by the presentation framework, the framework can call on just the sprite, instead of the images individually. As previously discussed, the style sheet code may be, for example, CSS that indicates to the user's web browser which pixels in the sprite comprise a particular image, so that the particular image may be displayed as it was originally intended.

As a concrete example, assume that images 130 and 135 are 120×120 pixel Portable Network Graphic (PNG) files and that they are styled on web pages 100 and 105, respectively, using the following, respective CSS selectors and associated rules:

```
.image130 {
    background: url(http://site.com/image130.png) no-repeat;
}
.image135 {
    background: url(http://site.com/image135.png) no-repeat;
}
```

Images 130 and 135 may be combined into a single image, as is illustrated in sprite 400, where the associated style sheet code (i.e., CSS for this particular example) may be as follows:

```
.image130, .image135 {
    background: transparent url(http://site.com/sprite.png) no-
    repeat 0 0;
}
.image130 {
    background-position: 0px 0px;
}
.image135 {
    background-position: 120px 0px;
}
```

It will be appreciated that the above file type used for images 130, 135 and sprite 400 (i.e., PNG) is for illustrative purposes only and that the images can be any of various, known file types used for images. It also will be appreciated that the CSS shown is for illustrative purposes only and that the images can be styled in any of a number of different ways, and that other CSS or style sheet languages (or similar) may be used to accomplish the same presentation/styling as the above, example CSS.

At block 325, the generated sprites may be saved within an image-serving framework, and the associated rules and style sheet code may be saved within a presentation framework. It will be appreciated that such frameworks may be part of, or extensions of, web server 200, or any of the databases or other accessible resources the web server calls on to receive all of the elements needed to render the page. In an embodiment, the sprites and their associated rules and style sheet code may be saved within the same framework, server, etc.

The process outlined in FIG. 3 may be run continuously or periodically, and such re-examination of the page modules may mean that as certain page modules' popularities shift over time, the system continues to focus on the best optimizations for serving the web pages.

After the process outlined in FIG. 3 has taken place, the web server may be able to serve web pages more quickly and efficiently. When a web page is requested, the web server may check to see which page modules the web page requires, and then check those page modules against the rules created at block 320 of FIG. 3. If a rule indicates that a sprite previously was created using a combination currently required by the page, then the sprite overlay manager may indicate to the page renderer that the HTML and/or CSS used by the page modules may be modified—before being sent to the user—to reference and incorporate the page modules' images from the sprite shared by the page modules, which modifications may be based on the style sheet code created previously by the sprite generator.

In an embodiment, if the rules indicate that a sprite previously was created from two page modules currently required by the web page, then the page modules may be marked by the sprite overlay manager as having been processed for purposes of the process illustrated in FIG. 3. By marking page modules in such a manner, they may be skipped during future invocations of the process outlined in FIG. 3; i.e., the process may not continuously try to re-optimize the same page modules.

In an embodiment, the page modules themselves may be duplicated (and stored) per sprite image usage instance as determined by the sprite generator. In this embodiment, front-end processing effort may be reduced because the page renderer may not have to modify the HTML and/or CSS; it simply could call on the "new" page module that includes the HTML and/or CSS required to take advantage of the page modules' images within the sprite.

In an embodiment, the sprite overlay manager could act as a "pass through" filter with respect to the output of the page renderer, so as to operate on the page as finally rendered. Such an embodiment may be advantageous if, for example, the system is trying to sprite images on web pages that are generated by a third-party, or if the system is dealing with some incompatible technology used in the generation of the web page.

The sequence and numbering of blocks depicted in FIG. 3 are not intended to imply an order of operations to the exclusion of other possibilities. Those of skill in the art will appreciate that the foregoing systems and methods are susceptible of various modifications and alterations. For example, block 310 may be skipped altogether, in which case the decision operation (at block 315) as to which combinations should be sprited may be based on, for example, the probabilities associated with each of the combinations (e.g., sprites may be generated for all combinations whose associated probabilities are >90%).

The various systems described herein may each include a storage component for storing machine-readable instructions for performing the various processes as described and illustrated. The storage component may be any type of machine-readable medium (i.e., one capable of being read by a machine or electronic component) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer-readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method to determine whether to generate a sprite, said method comprising:

generating a ranked list of probabilities of two or more page modules being simultaneously displayed on a particular web page based on web access logs indicating page module usage for the particular web page;

generating, in response to a probability, of the ranked list of probabilities, of a first page module and a second page module being simultaneously displayed on the one or more web pages exceeding at least a threshold probability of the first and the second page modules being simultaneously displayed on the particular web page:

the sprite comprising a first image within the first page module and a second image within the second page module;

a rule indicating that the sprite contains the first image and the second image; and a style sheet code associated with the sprite; and storing the sprite, the rule and the style sheet code to a resource accessible to a web server capable of serving the particular web page.

2. The method of claim 1, wherein the style sheet code comprises cascading style sheets (CSS).

3. The method of claim 1, further comprising:
in response to a request received by the web server to serve the particular web page, determining whether the rule exists; and
in response to determining that the rule exists, serving the particular web page based on at least the sprite and the style sheet code associated with the sprite.

4. The method of claim 3, further comprising marking the first and second page modules as having been processed in response to determining that the rule exists.

5. The method of claim 1, wherein probability is based on a frequency associated with how many times the first and second page modules have been previously displayed together on the particular web page over a predetermined period.

6. The method of claim 1, wherein said generating further comprises generating, before a future request of the particular web page, a third page module that renders substantially the same as the first page module, wherein the third page module is based on the sprite and the style sheet code.

7. A system to generate a sprite, said system comprising:
a web server for serving a set of web pages, wherein a particular web page in the set is capable of utilizing at least a first and a second page module; and
a sprite generator to:
generate a ranked list of probabilities of two or more page modules being simultaneously displayed on the particular web page based on web access logs indicating page module usage for the particular web page;
generate, in response to a probability, of the ranked list of probabilities, of the first page module and the second page module being simultaneously displayed on the particular web page exceeding at least a threshold probability of the first and the second page modules being simultaneously displayed on the particular web page:
a sprite comprising a first image within the first page module and a second image within the second page module;
a rule indicating that the sprite contains the first image and the second image; and
a style sheet code associated with the sprite; and
store the sprite, the rule and the style sheet code to a resource accessible to the web server.

8. The system of claim 7, wherein the web server comprises:
a sprite overlay manager to determine whether a rule exists indicating that, for the first page module and the second page module associated with the particular web page, a sprite has been generated; and
a page renderer to incorporate the style sheet code associated with the sprite with a markup code associated with at least one of the first and second page modules in response to the sprite overlay manager determining that the rule exists.

9. The system of claim 8, wherein, based on a determination that the rule exists, the sprite generator is capable of modifying the markup code from a previous version of the markup code.

10. The system of claim 7, wherein the sprite generator generates, before a future request of the particular web page, a third page module that renders substantially the same as the first page module, wherein the third page module is based on the sprite and the style sheet code.

11. The system of claim 7, wherein the style sheet code comprises cascading style sheets (CSS).

12. The system of claim 8, wherein the markup code comprises hypertext markup language (HTML).

13. The system of claim 8, wherein the sprite overlay manager is capable of filtering the output of the page renderer.

14. The system of claim 7, wherein the probability is based on a frequency associated with how many times the first and second page modules have been previously simultaneously displayed on the particular web page over a predetermined period.

15. A non-transitory computer-readable medium encoded with a set of instructions executable by a processor to:
generate a ranked list of probabilities of two or more page modules being simultaneously displayed on a particular web page;
generate, in response to a probability, of the ranked list of probabilities, of a first page module and a second page module being simultaneously displayed on the particular web page exceeding at least a threshold probability of the first and the second page modules being simultaneously displayed on the particular web page based on web access logs indicating page module usage for the particular web page;
the sprite comprising a first image within the first page module and a second image within the second page module;
a rule indicating that the sprite contains the first image and the second image; and
a style sheet code associated with the sprite; and
store the sprite, the rule and the style sheet code to a resource accessible to a web server capable of serving the particular web page.

16. The non-transitory computer-readable medium of claim 15, wherein the style sheet code comprises cascading style sheets (CSS).

17. The non-transitory computer-readable medium of claim 15, wherein the set of instructions are further executable by the processor to:
in response to a request received by the web server to serve the particular web page, determine whether the rule exists; and
in response to determining that the rule exists, serve the particular web page based on at least the sprite and the style sheet code associated with the sprite.

18. The non-transitory computer-readable medium of claim 17, wherein the set of instructions are further executable by the processor to mark the first and second page modules as having been processed in response to determining that the rule exists.

19. The non-transitory computer-readable medium of claim 15, wherein the probability is based on a frequency associated with how many times the first and second page modules have been previously simultaneously displayed on the particular web page within the set of web pages over a predetermined period.

20. The non-transitory computer-readable medium of claim 15, wherein the set of instructions are further executable by the processor to generate, before a future request of the one or more web pages, a third page module that renders substantially the same as the first page module, wherein the third page module is based on the sprite and the style sheet code.

* * * * *